United States Patent
Kwan et al.

(10) Patent No.: US 8,946,341 B2
(45) Date of Patent: Feb. 3, 2015

(54) POLYMER COMPOSITIONS COMPRISING POLY(ARYLETHER KETONE)S AND GRAPHENE MATERIALS

(75) Inventors: Kermit S. Kwan, Cumming, GA (US); Mohammad Jamal El-Hibri, Atlanta, GA (US); Hans Edouard Miltner, Rhode-St-Genese (BE)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 13/878,431

(22) PCT Filed: Oct. 10, 2011

(86) PCT No.: PCT/EP2011/067642
§ 371 (c)(1),
(2), (4) Date: Apr. 9, 2013

(87) PCT Pub. No.: WO2012/049121
PCT Pub. Date: Apr. 19, 2012

(65) Prior Publication Data
US 2013/0202832 A1  Aug. 8, 2013

Related U.S. Application Data

(60) Provisional application No. 61/392,281, filed on Oct. 12, 2010.

(51) Int. Cl.
*B60C 1/00* (2006.01)
*C08K 3/04* (2006.01)
*C08L 61/16* (2006.01)

(52) U.S. Cl.
CPC .. *C08K 3/04* (2013.01); *C08L 61/16* (2013.01)
USPC ........................................................ 524/495

(58) Field of Classification Search
USPC ........................................................ 524/495
See application file for complete search history.

(56) References Cited

U.S. PATENT DOCUMENTS

| | | | |
|---|---|---|---|
| 7,354,988 B2 | 4/2008 | Charati et al. | |
| 2002/0085968 A1 | 7/2002 | Smalley et al. | |
| 2009/0036605 A1 | 2/2009 | Ver Meer | |
| 2009/0281227 A1* | 11/2009 | Stern et al. | 524/496 |

FOREIGN PATENT DOCUMENTS

| | | |
|---|---|---|
| EP | 0430247 A1 | 6/1991 |
| WO | WO 2005034145 A1 | 4/2005 |
| WO | WO 2008003659 A1 | 1/2008 |
| WO | WO 2008048705 A2 | 4/2008 |
| WO | WO 2008056123 A1 | 5/2008 |
| WO | WO 2011117325 A2 | 9/2011 |
| WO | WO 2011117326 A2 | 9/2011 |

OTHER PUBLICATIONS

Jang, B. Z., et al—"Processing of nanographene platelets (NGPs) and NGP nanocomposites: a review", J. Mater. Sci., vol. 43, pp. 5092-5101 [DOI 10.1007/s10853-008-2755-2],Spring Science & Business Media, LLC; published online Jun. 24, 2008; 10 pgs.

Kim, Hyunwoo, et al—"Graphene/Polymer Nanocomposites", Macromolecules, vol. 43, pp. 6515-6530; [DOI: 10.1021/ma100572e], published on Web on Jul. 23, 2010, American Chemical Society; 16 pgs.

[Unknown Author]—"Graphene Outperforms Carbon Nanotubes for Creating Stronger, More Crack-Resistant Materials", published on Apr. 26, 2010, Rensselaer Polytechnic Institute, Troy, NY, RPI News; accessed online on May 1, 2013; available at http://news.rpi.edu/update.do?artcenterkey=2715&setappvar=page%281%29; 1 pg.

U.S. Appl. No. 13/635,469, filed Nov. 26, 2012, Hans Edouard Miltner, et al.

U.S. Appl. No. 13/635,474, filed Sep. 17, 2012, Hans Edouard Miltner, et al.

* cited by examiner

*Primary Examiner* — Ling Choi
*Assistant Examiner* — Thuy-Ai Nguyen

(57) ABSTRACT

Polymer compositions comprising poly(aryl ether ketone)s and graphene materials. In particular, a polymer composition comprising: A) a poly(arylether ketone) and B) 0.1 to 70 wt. %, based on the combined weight of A) and B), of at least one non-tubular graphene material. Use of such polymer compositions for the manufacture of molded or extruded articles. Molded or extruded articles made from such polymer compositions.

19 Claims, No Drawings

POLYMER COMPOSITIONS COMPRISING POLY(ARYLETHER KETONE)S AND GRAPHENE MATERIALS

Cross reference to related applications. This application is a U.S. national stage entry under 35 U.S.C. §371 of International Application No. PCT/EP2011/067642 filed Oct. 10, 2011, which claims priority to U.S. provisional application No. 61/392,281 filed Oct. 12, 2010, the whole content of this application being incorporated herein by reference for all purposes.

The present invention relates to polymer compositions comprising poly(arylether ketone)s and graphene materials Poly(arylether ketone)s are a known class of so called high-temperature resistant polymers which have found increasing use in a number of applications which could previously not be served by thermoplastic polymers.

Generally the term poly(arylether ketone) refers to polymers of which more than 50% of the recurring units are recurring units of one or more formulae containing at least one arylene group, at least one ether group and at least one ketone group.

Poly(aryl ether ketone)s are commercially available from a number of sources e.g. KetaSpire® from Solvay Advanced Polymers LLC or Victrex® from Victrex plc.

Poly(arylether ketone)s are generally recognized as the leading semi-crystalline high performance polymers. As semi-crystalline polymers poly(arylether ketone)s without reinforcement are not suitable for use in applications above their glass transition temperature and thus fibre-reinforced grades have been developed to extend the useful temperature range and to improve the stiffness. However, fibre reinforcement while increasing the maximum use temperature has a negative effect on ductility and impact resistance, which is undesirable.

Conductive compositions based on certain polymers including poly(arylether ketone)s as one type of polymer and carbon nanotubes have been described in U.S. Pat. No. 7,354,988 to General Electric Company. The products may be advantageously used for manufacturing automotive components or other components where electrical conductivity is needed.

WO 2008/048705 discloses a film for providing a desired level of lightning strike protection to a substrate comprising a polymeric film with a low density conductive material comprising nanoparticles dispersed throughout the film. Carbon nanofibres and carbon nanotubes are mentioned amongst suitable nanoparticles and poly(arylether ketone)s are listed amongst a group of thermoplastic polymer materials.

WO 08/056123 discloses composite materials comprising at least one prepreg, said prepreg comprising at least one polymeric resin and at least one fibrous reinforcement and conducting particles dispersed in the polymeric resin. Graphene sheets are amongst others mentioned as non-metallic conducting particles and polyetheretherketone is mentioned in an expansive list as a suitable polymer.

US patent application 2002/085968 relates to a method for providing self-assembled objects comprising single-wall carbon nanotubes (tubular carbon molecules) and compositions comprising polymers and such tubular carbon molecules. According to the specification and claims, the tubular carbon molecule can be a substantially defect-free cylindrical graphene sheet having from $10^2$ to $10^6$ carbon atoms and having fullerene caps or substituents at opposite ends of the cylindrical sheet. As will be explained later, graphene material as defined for the purpose of this invention cannot have a tubular structure.

Whereas the aforementioned products have satisfactory properties in terms of electrical conductivity and protection against lightning strike, there still is a need for poly(arylether ketone) compositions with a good balance of properties in terms of strength and maximum use temperature on one hand and ductility along with good impact resistance on the other hand.

Thus, it was an object of the instant invention to provide poly(arylether ketone) compositions having a good balance between stiffness on one hand and toughness on the other hand.

This object is achieved with the polymer compositions in accordance with claim 1. Preferred embodiments are set forth in the dependent claims and in the detailed description hereinafter.

Surprisingly it has been found that the addition of comparably low amounts of a graphene material (as described hereinafter) to poly(arylether ketone)s provides a significant increase in tensile modulus while the products still exhibit a normal yielding behaviour and a high level of impact strength. Further surprisingly it has been found that the addition of graphene materials also significantly improves stiffness and modulus at elevated temperatures despite the comparably low amount used. In addition, an increase in crystallization rates can be observed compared to the respective neat polymers, which allows faster production cycles and makes post moulding annealing (which is regularly applied in the prior art) unnecessary in certain instances.

The polymer compositions in accordance with the instant invention contain as component A) at least one poly(arylether ketone).

The term poly(aryl ether ketone) when used herein includes any polymer having more than 50% of the recurring units of one or more formulae comprising at least one arylene group, at least one ether group (—O—) and at least one ketone group (—CO—).

Preferred recurring units of the PAEK are derived from formulae (1) to (5) below:

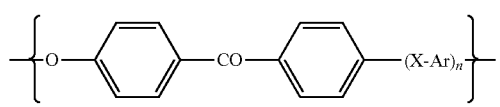

(1)

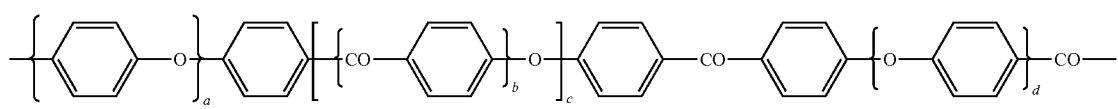

(2)

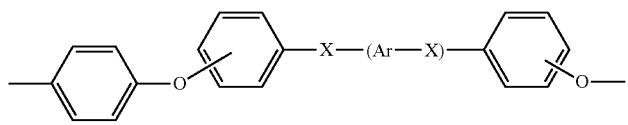
(3)
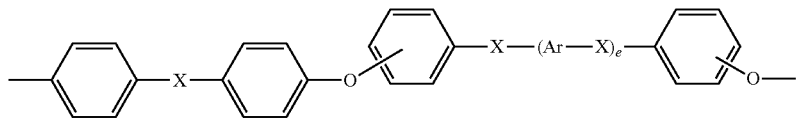
(4)
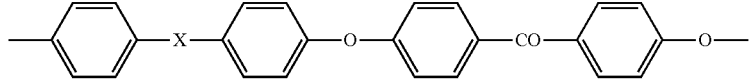
(5)
wherein
Ar is independently a divalent aromatic radical selected from phenylene, biphenylene or naphthylene,
X is independently —O—, —CO— or a direct bond,
n is an integer of from 0 to 3,
a is an integer of from 1 to 4,
b, c, d and e have independently the value 0 or 1
and d is preferably 0 if b is 1.
More preferred recurring units have the following formulae 6 to 25
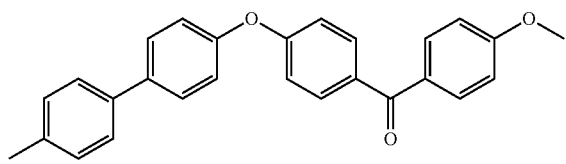
(6)
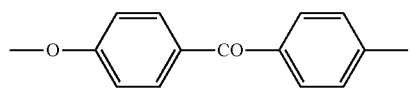
(7)
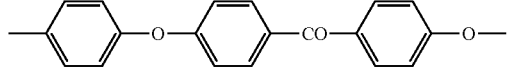
(8)
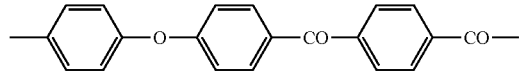
(9)
(10)
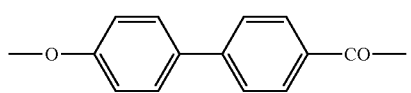
(11)
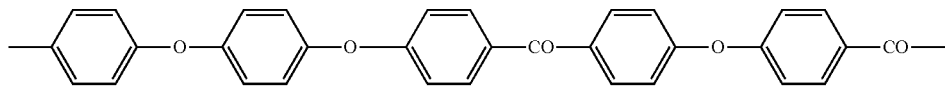
(12)
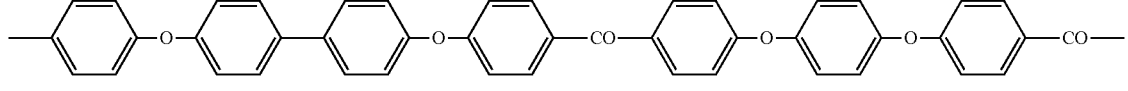
(13)
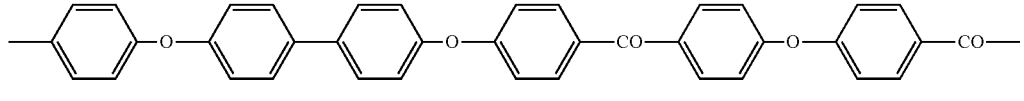
(14)
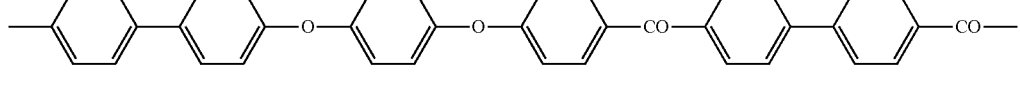
(15)
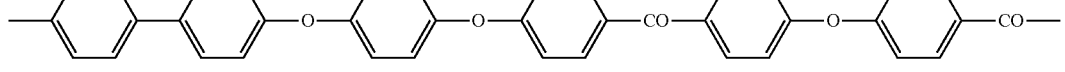
(16)

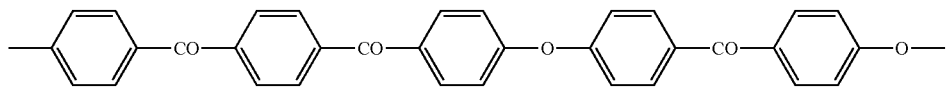

(17)

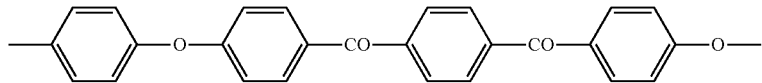

(18)

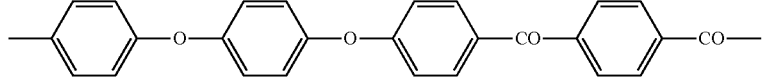

(19)

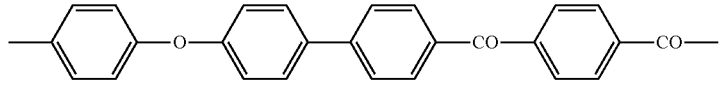

(20)

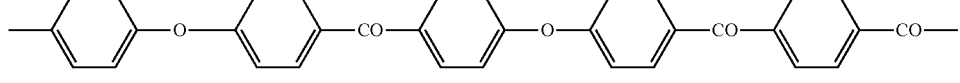

(21)

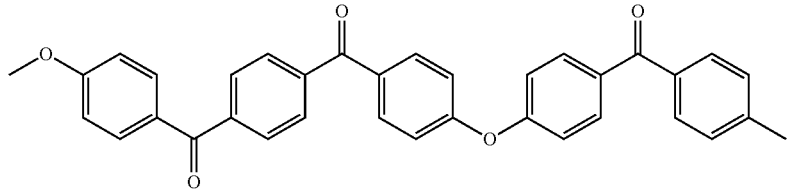

(22)

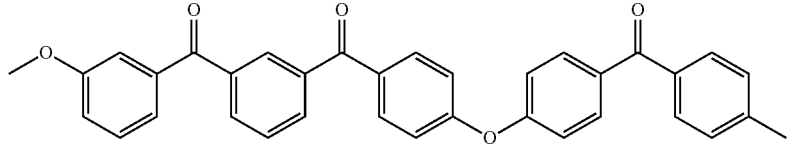

(23)

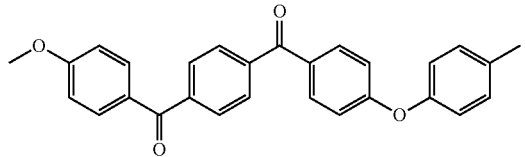

(24)

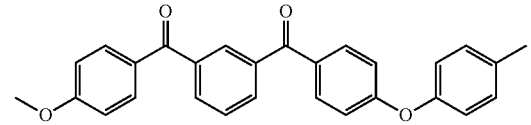

(25)

Still more preferably the recurring units are chosen from recurring units (6) to (8) and most preferably from recurring units of formula (8).

Poly(arylether ketone)s are commonly named in accordance with a system indicating the sequence of ether groups (designated as E) and ketone groups (designated as K).

Thus, a PEEK polymer is intended to denote any polymer of which more than 50% of the recurring units are recurring units of formula (8) whereas a PEK polymer would be used to denote any polymer of which more than 50% of the recurring units are recurring units of formula (6).

A PEEK homopolymer is intended to denote any polymer of which essentially all (if not all) the recurring units are recurring units of formula (8) and a PEK homopolymer is intended to denote any polymer of which essentially all (if not all) the recurring units are recurring units of formula (6).

It is to be understood that a poly(arylether ketone) can be a homopolymer (i.e. a polymer of which essentially all (if not all) the recurring units are of a single formula) or a random, alternating or block copolymer i.e. a polymer of which the recurring units are of at least two different formulae. Preferably more than 70%, more preferably more than 85% of the recurring units of the poly(arylether ketone) are recurring units of one or more formulae comprising at least one arylene group, at least one ether group (—O—) and at least one ketone group (—CO—), in particular recurring units of one or more formulae (6) to (25). Still more preferably, essentially all of the recurring units are recurring units of formulae (6) to (25) and most preferably the poly(arylether ketone) consists of recurring units of formulae (6) to (25). Excellent results have been obtained when the poly(arylether ketone) was a PEEK hompolymer.

In addition the poly(arylether ketone)s can contain sulfone containing recurring units in which at least one keto- or ether group is replaced by sulfone groups —SO$_2$—.

PAEKs are generally prepared by aromatic nucleophilic substitution. According to a suitable embodiment an aromatic diol (e.g. hydroquinone, bisphenols or mixtures thereof) is deprotonated with e.g. sodium carbonate and the resulting phenoxide may then be reacted with a dihalobenzophenone via a nucleophilic substitution. Processes for the manufacture of PAEK are known to the skilled person and described in the literature.

PAEKs are commercially available e.g. from SOLVAY ADVANCED POLYMERS L.L.C. under the tradename KETASPIRE®.

In certain cases it has proven advantageous to use a polymer powder with a small particle size (preferably with a weight average diameter in the range of from 20 to 100 micrometers) as the polymer matrix material as this has proven to yield particularly good results in some cases. Polymers in pellet form may be ground to respective powders by methods known to those skilled in the art.

The compositions in accordance with the instant invention contain (as component B) a non-tubular graphene material, preferably a non-tubular graphene sheet (platelet) material as hereinafter more precisely defined. Non-tubular as used herein shall mean that the basic unit of the graphene material is not rolled-up into cylinders as e.g. in carbon nanotubes.

Graphene itself is usually considered as a one-atom thick planar sheet of sp2-bonded carbon atoms that are densely packed in a honeycomb structure. The name graphene is derived from graphite and the suffix -ene. Graphite itself consists of a high number of graphene sheets stacked together.

Graphite, carbon nanotubes, fullerenes and graphene in the sense referred to above share the same basic structural arrangement of their constituent atoms. Each structure begins with six carbon atoms, tightly bound together chemically in the shape of a regular hexagon—an aromatic structure similar to what is generally referred to as benzene.

Perfect graphenes consist exclusively of hexagonal cells; pentagonal and heptagonal cells constitute defects in the structure. If an isolated pentagonal cell is present, the plane warps into a cone shape and the insertion of 12 pentagons would create a fullerene.

At the next level of organization is graphene itself, a large assembly of benzene rings in a basically planar sheet of hexagons that resembles chicken wire. The other graphitic forms are built up out of graphene. Buckyballs and the many other nontubular fullerenes can be thought of as graphene sheets wrapped up into atomic-scale spheres, elongated spheroids and the like. Carbon nanotubes are essentially graphene sheets rolled into minute cylinders. And finally, graphite is a thick, three-dimensional stack of graphene sheets; the sheets are held together by weak, attractive intermolecular forces (van der Waals forces). The feeble coupling between graphite sheets enables graphite to be broken up into miniscule wafers.

In the chemical literature graphene was defined officially in 1994 by the IUPAC (Boehm et al., Pure and Appl. Chemistry 66, 1893-1901 (1994)) as follows:

A single carbon layer of the graphitic structure can be considered as the final member of the series naphthalene, anthracene, coronene, etc. and the term graphene should therefore be used to designate the individual carbon layers in graphite intercalation compounds.

According to the IUPAC compendium on technology, the term graphene should only be used when the reactions, structural relations or other properties of individual layers are discussed, but not for three-dimensional structures.

In the literature graphene has also been commonly referred to as monolayer graphite.

One way to obtain graphene is to exfoliate it, i.e. to peel it off from graphite with an adhesive tape repeatedly. Graphene produced this way is, however, extremely expensive.

Another method is to heat silicon carbide (SiC) to temperatures above 1100° C. to reduce it to graphene. This process produces a sample size that is dependent upon the size of the SiC substrate used. However, again products obtained by this process are very expensive.

Experimental methods have been reported for the production of graphene ribbons consisting of cutting open carbon nanotubes (Nature 2009, 367). Depending on the substrate used (single- or multi-walled nanotubes) single graphene sheets or layers of graphene sheets can be obtained. However, due to the fact that carbon nanotubes are very expensive materials, graphene products obtained this way are not commercially feasible as components of polymer compositions.

M. Choucair et al., Nature Nanotechnology 4, 30-33 (2009) discloses a process for producing gram quantities of graphene by the reduction of ethanol by sodium metal, followed by pyrolysis of the ethoxide product and washing with water to remove sodium salts.

Recently, a new type of graphene materials, so called nanographene platelets or NGP, has been developed and respective products are commercially available, for example from Angstron Materials LLC. NGP refers to an isolated single layer graphene sheet (single layer NGP) or to a stack of graphene sheets (multi-layer NGP). NGPs can be readily mass produced and are available at lower costs and in larger quantities compared to carbon nanotubes. A broad array of NGPs with tailored sizes and properties can be produced by a combination of thermal, chemical and mechanical treatments.

Typically, without being limited thereto, the stack thickness of NGPs can be as low as 0.34 nm (single-layer NGP) and up to 100 nm or even more (multi-layered NGP). The number of single layers in a NGP can be easily derived from the stack thickness by dividing same by the thickness of a single graphene layer (which is 0.34 nm). Thus, e.g. a NGP with a stack thickness of 2 nm comprises 6 single graphene layers.

The aspect ratio of NGPs can generally cover a very broad range of from 1 to 60,000, preferably of from 1 to 25,000 and most preferably of from 1.5 to 5000. Particularly preferred platelets have an aspect ratio in two directions or dimensions of at least 2, in particular of at least 3 or more. This aspect ratio applies for nanographene platelets in two dimensions and in this respect nanographene platelets differ fundamentally from carbon black or carbon-nanotubes. Carbon black particles are spheroidal and lack any significant aspect ratio relating to their dimensions. Carbon-nanotubes have a high aspect ratio in one direction, along the length or main axis of the carbon tube. This is a characteristic feature of an elongated structure like a fibrous or needle like particle. Compared to this platelets have a high aspect ratio for two of the three directions or dimensions relative to the third direction or dimension. This difference has a significant influence on the properties of the products in accordance with the instant invention as is apparent from the examples. Typically, the length and width of NGPs parallel to the graphene plane is in the range of from 0.5 to 20 micrometers.

The specific surface area of NGP can vary over a wide range, but is generally higher than the specific surface area of standard graphite when measured under identical conditions. This is an indication of the inherently much finer scale and exfoliation of NGPs. Although there are other forms of carbon also having similar or higher specific surface areas such as carbon-nanotubes, these surprisingly do not offer the combination of benefits and advantages seen for NGP as illustrated in the working examples below. The specific surface area, as measured by the BET method (as described below) preferably exceeds 6 $m^2/g$, more preferably 9 $m^2/g$ and even more preferably 12 $m^2/g$ and may be as high as exceeding 30 $m^2/g$, preferably exceeding 60 $m^2/g$ and even exceeding 90 $m^2/g$. Good results have also been obtained with specific surface areas of less than 40 $m^2/g$, in certain cases as low as below 30 $m^2/g$ and in particular with surface areas of up to 20 $m^2/g$. Measured specific surface areas for several of the nanographene platelets (NGP) described in the examples along with that of standard graphite are shown in Table 1.

The BET measurement was carried out as follows:

Material Pre-treatment

All samples were first treated in a non-ventilated oven at 330° C. for 6 hours prior to any further analysis. Following this pretreatment step, essentially aimed at eliminating residual traces of possible surfactants or other organic surface treatments, vacuum drying was conducted at 150° C. to ensure that all samples are thoroughly dry and surfactant-free, so as to allow proper specific surface area comparison between them.

Equipment Used

The BET equipment used was a GEMINI 2360 from MICROMETRICS. Auxiliary equipment (vacuum pump, FLOWPREP sample conditioner, helium and nitrogen compressed gas bottles, liquid nitrogen, samples holders, etc.) were used according to standard procedures.

Experimental Procedure

The empty tube was first purged by helium for about 15 minutes then sealed under helium atmosphere. The sealed tube was weighed (0.0001 g accurate; $P_1$=empty tube weight). About 200 mg of sample material was introduced into the tube using a funnel (in practice, sample weights in the range 30-170 mg have been used; weight determination 0.1 mg accurate). The tube was again put under helium atmosphere for about 15 minutes prior to being sealed. The filled tube was next weighed (0.0001 g accurate; $P_2$=empty tube weight plus sample weight). The tube was put into the FLOWPREP oven at 275° C.; vacuum was progressively applied and held for about 2 hours, after which the tube was slowly cooled, filled with helium and sealed. The sealed tube was again weighed (0.0001 g accurate; $P_3$=empty tube weight plus sample weight). The effective sample weight was P (g)=P3-P1. At this point, the tube was unsealed and connected to the GEMINI 2360 apparatus. A dewar was filled with liquid nitrogen and the BET experimental specific surface (SSA) determination was started by following the instructions from the GEMINI software interface.

TABLE 1

| Designation By Supplier | Carbon Form | Experimental Specific Area, SSA ($m^2/g$) |
|---|---|---|
| N008-100-05* | NGP | 22 |
| N006-010-00* | NGP | 12 |
| N002-001-05* | NGP | 32 |
| XGnP 5 | NGP | 28 |
| Superior Graphite 4735 | Standard Graphite | 4 |

*sometimes 05 denoted as P and 00 denoted as N by vendor

Furthermore, NGPs are available in different degrees of polarity, characterized by the oxygen content of the graphene surface. NGPs having an oxygen content of 0.5% by weight or more are generally referred to as polar grades whereas NGPs having an oxygen content of less than 0.5% by weight, preferably 0.2% by weight or less are referred to as non-polar grades. All these types of products are commercially available, for example from Angstron Materials L.L.C. and XG Sciences, other suppliers offering part of the range.

All structural parameters discussed hereinbefore and below refer to the graphene materials as such, i.e. these properties are determined prior to the incorporation of the graphene material into the polymer matrix. As is well known to the person skilled in the art, during compounding according to the usual methods, properties like aspect ratio or thickness may change so that the respective values of the parameters mentioned in the molding composition or in the molded product might be different from what has been described above.

Graphene materials as referred to herein encompass all the different products defined above, which are principally suitable for the purpose of the instant invention. Nano-graphene platelets (NGPs) have been proven particularly advantageous in a number of cases and for a significant number of applications.

Whereas the stack thickness of the NGPs is not particularly critical, it has been observed during compounding with the poly(arylether ketone)s that products having a stack thickness significantly exceeding 10 nm form larger agglomerates of up to 50 micrometers which is an indication of a deterioration of the NGP dispersion or distribution in the poly(arylether ketone) matrix, whereas products having stack thicknesses of 10 nm or less show a more uniform distribution of the NGP in the polymer matrix, which is advantageous when aiming for the improvement of certain properties.

The polarity, i.e. the oxygen content of the NGP can have an influence on specific properties of the polymer compositions in accordance with the instant invention. As is shown in the working examples below, non-polar grades appear to be particularly beneficial when aiming at a good tensile elongation at break or impact strength.

Preferred NGPs for use in the compositions in accordance with the instant invention can be obtained in accordance with the methods in U.S. Pat. No. 7,071,258 and US patent application 2008/0279756, referred to hereinbefore.

The NGPs in accordance with U.S. Pat. No. 7,071,258 comprise at least a nanometer-scaled plate with said plate comprising a single sheet of graphene plane or a multiplicity of sheets of graphene plane; said graphene plane comprising a two-dimensional lattice of carbon atoms and said plate having a length and a width parallel to said graphene plane and a thickness orthogonal to said graphene plane characterized in that the length, width and thickness values are all smaller than approximately 100 nm, preferably smaller than 20 nm.

The process in accordance with US patent application 2008/0279756 yields NGP's with stack thicknesses of generally 100 nm or smaller, preferably 10 nm or smaller. As mentioned earlier, a single sheet NGP has a stack thickness of 0.34 nm. The particle length and width of additive products in accordance with this patent application typically range of from 1 to 50 micrometers, preferably of from 1 to 25 micrometers but can be longer or shorter.

The content of graphene materials in the compositions in accordance with the instant invention is generally in the range of from 0.1 to 70 wt. %, based on the combined weight of poly(arylether ketone) A) and graphene material B). Preferably the amount of graphene is at least 0.5, more preferably at least 1 to most preferably at least 2 wt. %, in each case being based on the combined weight of poly(arylether ketone) and graphene material. The amount of graphene is preferably at most 20, more preferably at most 10 and most preferably at most 8 wt. %, in each case based on the combined weight of components A) and B).

Preferably, components A) and B) together make up at least 50 wt %, more preferably at least 70 wt % and even more preferably at least 90 wt % of the total weight of the compositions in accordance with the invention.

Particularly preferably the compositions in accordance with the instant invention consist essentially of components A) and B) or still more preferably consist of A) and B).

However, it is also possible that the compositions in accordance with the instant invention comprise further polymeric components.

In accordance with a specific embodiment in accordance with the instant invention, the polymer compositions comprise, in addition to the poly(arylether ketone) another semicrystalline polymer. The weight ratio of the poly (arylether ketone) to the semicrystalline polymer is equal to or greater than 1. In principle all semicrystalline polymers having a thermal stability sufficient to be processed with poly (arylether ketones) can be used and respective polymers are known to the skilled person and commercially available from various sources. Only by way of example polyphenylene sulphide, also known as PPS, may be mentioned here as well as polyphthalamide or thermoplastic polyimides.

In accordance with another specific embodiment in accordance with the instant invention, the polymer compositions comprise, in addition to the poly(arylether ketone) at least one amorphous polymer. The weight ratio of the poly (arylether ketone) to the amorphous polymer is preferably at least 0.5 and ranges more preferably from 0.5 to 10, and typically from 1 to 5. In principle all amorphous polymers having a thermal stability sufficient to be processed with poly(aryl ether ketone)s can be used and respective polymers are known to the skilled person and commercially available from various sources. Only by way of examples, poly(arylether sulfone)s, including bisphenol A polysulfone, polyethersulfone (also known as PESU) and poly(biphenyl ether sulfone)s like polyphenylsulfone (also known as PPSU), may be mentioned here. Poly(aryl ether sulfone)s are notably commercially available from SOLVAY ADVANCED POLYMERS, L.L.C. as UDEL®, RADEL® A, RADEL® R and EPISPIRE®.

In certain cases, it has proven advantageous to include fillers in the compositions in accordance with the instant invention.

Any filler is in principle suitable for use in the present invention; fillers known for being profitably incorporated into a poly(arylether ketone) matrix will be advantageously used. The skilled person will easily recognize the filler which fits best for the polymer composition in accordance with the instant invention. Generally, the filler is chosen depending on its chemical nature, its number average length, its number average diameter, its number average aspect ratio, its ability to feed nicely in compounding equipment without bridging and surface treatment (notably because good interfacial adhesion between the filler and the polymer matrix improves the stiffness and the toughness of the blend).

According to certain embodiments the filler is a reinforcing filler. Reinforcing fillers are well known to the skilled person in the art. Reinforcing fillers, when used, generally form a blend having a tensile strength which is higher than that of the polymer composition without filler. The tensile strength can be measured on 3.2 mm (0.125 in) thick ASTM test specimens in accordance with ASTM D-638. Platy fillers, acicular fillers and fibrous fillers are generally reinforcing fillers, and can often provide a high increase in the tensile strength of the polymer compositions.

Platy fillers are well known by the skilled person in the art. Typically, platy fillers consist essentially of, or even consist of, particles having the shape of, or resembling to a plate, i.e. the particles are flat or nearly flat and their thickness is small in comparison with the other two dimensions. Certain platy fillers are notably described in chapter 17.4.2, p. 926 to 930 of Plastics Additives Handbook, 5th edition, Hanser, the whole content of which is herein incorporated by reference. As referred to hereinafter, the parameter n denotes the refractive index under standard conditions and H denotes the Mohs hardness. The Mohs hardness scale consists of 10 standard minerals starting with talc (Mohs hardness 1) and ending with diamond (Mohs hardness 10). The hardness is determined by finding which of the standard minerals the test material will scratch or not scratch; the hardness will lie between two points on the scale—the first point being the mineral which is scratched and the next point being the mineral which is not scratched. The steps are not of equal value; e.g. the difference in hardness between 9 and 10 is much bigger than between 1 and 2. Non limitative examples of platy fillers include talc (n=1.57-1.69, H=1), micas such as muscovite mica (n=1.55-1.61; H ranges from 2.5 to 4) and phlogopite mica (n=1.54-1.69, H=2.5-3), kaolins such as kaolinite (n=1.56-1.61, H=2), calcinated kaolin or mullite (n=1.62, H ranges from 6 to 8, depending on the calcination temperature), and clay such as Bali clay (n=1.6, H=2-2.5).

Acicular fillers are also well known by the skilled in the art. Typically, acicular fillers consist essentially of, or even consist of, particles having the shape of, or resembling to a needle. The particles of acicular fillers, as contained in the polymer composition in accordance with the instant invention, have typically a number average aspect ratio of between 2 and 20. Notably to the purpose of achieving an increased reinforcing effect, the number average ratio of the particles as contained in the polymer composition in accordance with the instant invention, is preferably of at least 3.0, more preferably at least 4.5, still more preferably at least 6.0; when high dimensional stability and low warpage are needed, the number average aspect ratio is preferably of at most 15. The number average aspect ratio of the particles of a filler can be determined by optical microscopy coupled with an image analysis software. To this purpose, the particles are advantageously finely dispersed in a solvent such as ethanol. The magnification ranges generally from about 200 to about 400. The image analysis software can be based on Otsu's method as described in "A Threshold Selection Method from Gray-Level Histograms", IEEE Trans. Syst. Ma. Cybern., 9, 62-66 (1979), the whole content of which is herein incorporated by reference. The number average aspect ratio can be defined as the number average of the aspect ratios of each particle taken individually, and the aspect ratio of a particle can be defined as its length over diameter ratio. The length of a particle can be defined as the length of the major axis of the ellipse having the same normalized second order moment as the particle, while the diameter of the particle can be defined as the length of the minor axis of the ellipse having the same normalized second order moment as the particle.

Among acicular fillers, wollastonite (n=1.65, H=4.5-5) and xonotlite (n=1.59, H=6.5) are preferred. Wollastonite is a white calcium metasilicate with good resistance to alkalis; wollastonite is notably described in chapter 17.4.3.1, p. 930 to 931 of Plastics Additives Handbook, 5th edition, Hanser, the whole content of which is herein incorporated by reference. Xonotlite is an inosilicate; typically, its formula is $Ca_6Si_6O_{17}(OH)_2$. Other acicular fillers suitable for the purpose of the present invention include sepiolite, attapulgite and palygorskite.

Finally, fibrous fillers are also well known by the skilled in the art. Typically, fibrous fillers consist essentially of, or even consist of, particles having the shape of, or resembling to a fibre, i.e. the particles are slender and greatly elongated, and their length is very high in comparison with the other two dimensions. Notably to the purpose of increased reinforcement, the particles of fibrous fillers, as contained in the polymer composition in accordance with the instant invention, have:

a number average ratio which is typically above 5, preferably above 10 and more preferably above 15;

a number average length which typically of at least 50 µm, preferably at least 100 µm and more preferably at least 150 µm; and a number average diameter which is typically below 25 µm, preferably below 20 µm, and more preferably below 15 µm.

When contained in the composition in accordance with the instant invention, the particles of fibrous fillers have a number average length generally below 30 mm, and a number average diameter generally above 3 µm. Certain fibrous fillers are notably described in chapters 17.4.3.2 and 17.4.3.3, p. 930 to 931 of Plastics Additives Handbook, 5$^{th}$ edition, Hanser, the whole content of which is herein incorporated by reference. Among fibrous fillers usable in accordance with the present invention, glass fiber, asbestos, synthetic polymeric fibre, aramid fibre, aluminum fibre, titanium fibre, magnesium fibre, aluminum silicate fibre, silicon carbide fibres, boron carbide fibres, rock wool fibre, steel fibre etc. can be cited. As can be seen, a particular class of fibrous fillers consists of whiskers, i.e. single crystal fibres made from various raw materials, such as $Al_2O_3$, SiC, BC, Fe and Ni. Among fibrous fillers, glass fibres are preferred; they include chopped strand A-, E-, C-, D-, S- and R-glass fibres, as described in chapter 5.2.3, p. 43-48 of Additives for Plastics Handbook, 2$^{nd}$ edition, John Murphy, the whole content of which is herein incorporated by reference. Depending on their type, glass fibres have a refractive index n of from about 1.51 to about 1.58, and a Mohs hardness H of 6.5.

Preferably, the filler is chosen from acicular fillers and fibrous fillers in case a composition with increased tensile properties is aimed for.

Very preferably, the filler is chosen from fibrous fillers. Excellent results have been obtained with glass fibres or carbon fibres.

In cases where fillers are not primarily used for increasing tensile strength, spherical fillers or fillers with a shape coming close to a spherical particle may be advantageously used. The skilled person will decide on the type of filler in accordance with the desired properties of the polymer compositions.

According to certain embodiments nanoparticulate fillers, i.e. fillers having a particle size preferably below 300 nm, more preferably below 150 nm, have proved advantageous.

The polymer compositions in accordance with the instant invention may also comprise additives known to the skilled person for polymer compositions of this type provided they exhibit the thermal stability required due to the processing temperatures of the products.

The polymer compositions in accordance with the instant invention show, upon the incorporation of comparatively low levels of graphene materials a performance bridging a gap existing between unmodified unfilled poly(arylether ketone)s on one hand and fibre reinforced poly(arylether ketone) compositions on the other hand. The modified compositions exhibit increased tensile and flexural modulus compared to the neat poly(arylether ketone)s and, in some cases, a good retention of ductile mechanical behaviour. Depending on the degree of polarity of the graphene material a more or less pronounced effect on resin ductility is observed. Non-polar grades appear to be the choice when aiming at good impact properties or a good tensile elongation at break.

Thus, the polymer compositions in accordance with the instant invention open application areas for poly(arylether ketone)s for which the existing products based on poly(arylether ketone)s have not been suitable in the past.

The following examples show the beneficial properties of the polymer compositions in accordance with the instant invention and represent preferred embodiments of the instant invention. However, it is apparent for the person skilled in the art, that these examples are not limiting the scope of the invention as defined in the claims but are merely preferred variations within the scope of the claims.

EXAMPLES 1 to 18

In all the following examples a PEEK homopolymer having a melt viscosity in the range of from approximately 0.38 kPa·s to approximately 0.50 kPa·s as measured by capillary melt rheometry at a temperature of 400° C. and a shear rate of 1000 s$^{-1}$ and commercially available from Solvay Advanced Polymers LLC under the tradename KetaSpire® KT-820 FP was used as the polymer matrix material. FP designates a fine powder grade having a mean particle size (weight average particle diameter) between 40 and 70 micrometer.

A Berstorff 25 mm twin screw co-rotating intermeshing extruder with eight barrel segments and an L/D of 40 was used for all the compounding. In all cases except that of the carbon fibre filled formulation, all the ingredients were premixed as a pre-blend and fed as a single physical mixture using a gravimetric feeder into barrel 1 of the extruder. For the carbon fibre filled formulation the carbon fibres were metered downstream at barrel 5. Vacuum venting was applied at barrel 7. The detailed compounding conditions are set forth in Table 2 below.

TABLE 2

| Ex. No. | Barrel temp. °C. | Screw speed min$^{-1}$ | Feed rate kg/h | Die pressure kPa | Vacuum level mm Hg | Melt temp. °C. |
|---|---|---|---|---|---|---|
| 1 | 330 | 150 | 6.80 | 717 | 22 | 392 |
| 2 | 330 | 175 | 3.63 | 758 | 22 | 412 |
| 3 | 330 | 175 | 3.63 | 745 | 22 | 413 |
| 4 | 330 | 175 | 3.49 | 745 | 22 | 414 |
| 5 | 330 | 175 | 3.49 | 779 | 22 | 414 |
| 6 | 340 | 175 | 3.49 | 731 | 22 | 412 |
| 7 | 340 | 175 | 3.49 | 765 | 22 | 416 |
| 8 | 340 | 175 | 3.04 | 765 | 22 | 413 |
| 9 | 340 | 175 | 3.04 | 765 | 22 | 417 |
| 10 | 340 | 175 | 2.59 | 689 | 22 | 415 |
| 11 | 330 | 175 | 2.72 | 1262 | 24 | 399 |
| 12 | 330 | 175 | 3.49 | 1282 | 24 | 401 |
| 13 | 330 | 175 | 3.49 | 1558 | 24 | 412 |
| 14 | 330 | 175 | 3.49 | 848 | 16 | 405 |
| 15 | 330 | 175 | 2.72 | 1262 | 24 | 399 |
| 16 | 330 | 175 | 2.72 | 1007 | 24 | 412 |
| 17 | 330 | 175 | 2.72 | 972 | 24 | 407 |
| 18 | 330 | 175 | 3.49 | 903 | 12 | 412 |

The barrel temperature setting was identical for barrels 2 to 8.

For the injection molding of the test specimens a Miniature Molding, Inc. MiniJector vertical injection molding machine model 55-1 SOL with a screw diameter of 22.2 mm, an UD ratio of 15:1 and a maximum shot capacity of 28.6 grams was used. The process used for molding all the formulations utilized essentially the same process parameters as shown below:

Barrel heater zone 1 (Top): 400° C.
Barrel heater zone 2 (Bottom): 400° C.
Nozzle: 410° C.
Injection time: 2 s
Hold time: 6 s
Total cycle time: 16 s
Injection pressure: 6205±138 kPa
Mold temperature: 94° C.

Mechanical property testing was conducted at room temperature per ASTM standards on annealed specimens (annealing conditions: 200° C. for 2 hours). Annealing was performed on all mechanical test specimens to ensure that the injection molded parts were fully crystalline and to take out crystallinity as a possible biasing variable in the comparison of the mechanical properties between the various formulations.

Mechanical property testing was carried out according to the following ASTM standards:
  Tensile properties: D638, with a crosshead speed of 5.0 mm/min
  Flexural properties: D570
  Notched Izod impact: D256
  Unnotched Izod impact: D4812
  Heat deflection temperature (HDT): D648

Capillary rheometry was performed according to ASTM D3835 to measure viscosity versus shear rate at 400° C. using an LCR 7000 capillary rheometer from Alpha/Dynisco Instruments.

Melt stability testing was conducted on the same rheometer using a VR40 test at a temperature of 410° C. VR 40 is defined as the viscosity ratio of the viscosity at 40 minutes dwell time in the capillary rheometer to that at a dwell time of 10 minutes.

Dynamic mechanical analysis (DMA) was conducted in torsion mode on annealed ASTM flexural bars to generate the storage and loss shear moduli G' and G", respectively, as a function of temperature over the temperature range from room temperature to 200° C.

Differential scanning calorimetry (DSC) was used at a heating and cooling rate of 20° C. to heat the samples to complete melting and then cool them down to record a crystallization temperature Tc as the peak temperature of the crystallization exotherm. The DSC parameter of most interest was Tc as an indirect measure of crystallization rate Table 3 shows the designation and some characteristic properties of the graphene materials as determined by the manufacturer used in the examples in accordance with the instant invention. The platelet lateral dimensions described are number averages of average X and Y dimensions (assuming the lateral dimensions X and Y to be equal). The individual X and Y average value dimensions are number averages determined experimentally by dynamic light scattering of NGP in suspension using water or a solvent such as isopropyl alcohol. Concentrations used are typically in the range from about 0.02 to 2.0%. The nominal platelet thicknesses are calculated using the average X and Y lateral dimensions and the experimental BET results for surface areas.

TABLE 3

| Designation By Supplier | Designation in Tables | Nominal Platelet Thickness (nm) | Platelet lateral Dimension (μm) | Polar/Non-Polar |
|---|---|---|---|---|
| N008-100-05 | NG 1 | 50 | 5–10 | Polar |
| N006-010-00 | NG 2 | 10 | 5–10 | Non-polar |
| N002-001-00 | NG 3 | <1 | 5–10 | Non-polar |
| XGnP 5 | NG 4 | 10 | 5 | Polar |
| XGnP 10 | NG 5 | 10 | 10 | Polar |
| XGnP 25 | NG 6 | 10 | 25 | Polar |

The first three graphene materials are commercially available from Angstron LLC, and the last three are available from XG Sciences.

The results of the measurement of the mechanical and dynamic properties are set forth in Table 4

TABLE 4

| Example | 1* | 2 | 3 | 4 |
|---|---|---|---|---|
| PAEK Amount wt % | 100 | 97.5 | 95 | 92.5 |
| Additive | — | NG 1 | NG 1 | NG 1 |
| Amount wt. % | 0 | 2.5 | 5.0 | 7.5 |
| Tensile Yield strength (MPa) | 93.1 | 89.6 | 89.6 | 91.0 |
| Tensile modulus (MPa) | 3798 | 4295 | 5026 | 5943 |
| Tensile Yield Elongation (%) | 5.3 | 5.3 | 4.5 | 4.1 |
| Tensile Elongation at break (%) | 73 | 16 | 7.4 | 5.6 |
| Flex strength (MPa) | 149.6 | 150.3 | 154.4 | 164.8 |
| Flex modulus (MPa) | 3730 | 4129 | 4584 | 5253 |
| Notched Izod, (J/m) | 99.3 | 76.4 | 64.6 | 56.6 |
| No Notch Izod, (J/m) | NB | NB | 1826 100% C | 1260 100% C |
| HDT (° C.) | 159 | 164 | 169 | 188 |
| Viscosity (kPa · s) | 0.40 | 0.44 | 0.48 | 0.59 |
| VR 40 (410° C.) | 1.11 | 1.21 | 1.09 | 1.14 |
| Crystallization temp. (° C.) | 288.4 | 290.6 | 291.7 | 292.5 |
| G' Modulus (Pa) × $10^{-8}$, via DMA | 1.03 | 1.54 | 2.11 | 2.93 |

| Example | 1* | 5 | 6 | 7 |
|---|---|---|---|---|
| PAEK Amount wt. % | 100 | 97.5 | 95 | 92.5 |
| Additive | — | NG 2 | NG 2 | NG 2 |
| Amount wt. % | 0 | 2.5 | 5.0 | 7.5 |
| Tensile Yield strength (MPa) | 93.1 | 95.8 | 96.5 | 97.9 |
| Tensile modulus (MPa) | 3798 | 4184 | 4798 | 5846 |
| Tensile Yield Elongation (%) | 5.3 | 5.4 | 5.2 | 5.3 |
| Tensile Elongation at break (%) | 73 | 66 | 30 | 17 |
| Flex strength (MPa) | 149.6 | 157.2 | 162.7 | 166.1 |
| Flex modulus (MPa) | 3730 | 4074 | 4591 | 5053 |
| Notched Izod, (J/m) | 99.3 | 95.1 | 81.2 | 71.6 |
| No Notch Izod, (J/m) | NB | NB | NB | 2601 20% C 80% NB |
| HDT (° C.) | 159 | 162 | 167 | 169 |
| Viscosity (kPa · s) | 0.40 | 0.41 | 0.43 | 0.45 |
| VR 40 | 1.11 | 1.11 | 1.16 | 1.25 |
| Crystallization temp. (° C.) | 288.4 | 294.5 | 290.2 | 291.0 |
| G' Modulus (Pa) × $10^{-8}$, DMA | 1.03 | 1.21 | 1.68 | 1.95 |

| Example | 1* | 8 | 9 | 10 |
|---|---|---|---|---|
| PAEK Amount wt. % | 100 | 97.5 | 95 | 92.5 |
| Additive | — | NG 5 | NG 5 | NG 5 |
| Amount wt. % | 0 | 2.5 | 5.0 | 7.5 |
| Tensile Yield strength (MPa) | 93.1 | 92.4 | 91.7 | 93.8 |
| Tensile modulus (MPa) | 3798 | 4426 | 5088 | 5639 |
| Tensile Yield Elongation (%) | 5.3 | 5.4 | 5.1 | 5.0 |
| Tensile Elongation at Break (%) | 73 | 31 | 15 | 9.6 |
| Flex strength (MPa) | 149.6 | 157.2 | 155.8 | 163.4 |
| Flex modulus (MPa) | 3730 | 4343 | 4522 | 5074 |
| Notched Izod, (J/m) | 99.3 | 75.8 | 73.2 | 66.8 |
| No Notch Izod, (J/m) | NB | 1768 20% C 80% NB | NB | 1634 20% C 80% NB |
| HDT (° C.) | 159 | 163 | 164 | 177 |
| Viscosity (kPa · s) | 0.40 | 0.47 | 0.48 | 0.50 |
| VR 40 | 1.11 | 1.10 | 1.05 | 1.09 |

TABLE 4-continued

| | | | | |
|---|---|---|---|---|
| Crystallization temp. (° C.) | 288.4 | 290.7 | 292.0 | 293.2 |
| G' Modulus (Pa) × $10^{-8}$, via DMA | 1.03 | 1.58 | 1.99 | 2.58 |

| Example | 11* | 12* | 13* | 14* |
|---|---|---|---|---|
| PAEK Amount wt. % | 100 | 92.5 | 92.5 | 92.5 |
| Additive | — | SG4735[1)] | MPC[2)] | C30[3)] |
| Amount wt. % | 0 | 7.5 | 7.5 | 7.5 |
| Tensile Yield strength (MPa) | 95.1 | 95.8 | 106.2 | 139.9 |
| Tensile modulus (MPa) | 3723 | 5150 | 4467 | 7652 |
| Tensile Yield Elongation (%) | 5.4 | 5.4 | 5.2 | 3.8 |
| Tensile Elongation at Break (%) | 49 | 16 | 11 | 6.2 |
| Flex strength (MPa) | 148.2 | 156.4 | 166.8 | 223.2 |
| Flex modulus (MPa) | 3668 | 4684 | 4431 | 6622 |
| Notched Izod, (J/m) | 106.8 | 79.0 | 71.7 | 86.0 |
| No Notch Izod, (J/m) | NB | 1874 C | 160.2 NB 1816 C | 849 C |
| HDT (° C.) | 159 | 163 | 165 | 209 |
| Viscosity (kPa · s) | 0.40 | 0.42 | 0.64 | 0.42 |
| VR 40 | 1.13 | 1.07 | 1.01 | 0.98 |
| Crystallization temp. (° C.) | 288.1 | 290.5 | 282.3 | 286.3 |
| G' Modulus (Pa) × $10^{-8}$, DMA | 0.95 | 2.00 | 1.43 | 2.68 |

| Example | 15 | 16 | 17 | 18* |
|---|---|---|---|---|
| PAEK Amount wt. % | 92.5 | 92.5 | 92.5 | 92.5 |
| Additive | NG 3 | NG 4 | NG 6 | Ketjen Black[4)] |
| Amount wt. % | 7.5 | 7.5 | 7.5 | 7.5 |
| Tensile Yield strength (MPa) | 104.1 | 94.5 | 90.3 | 101.3 |
| Tensile modulus (MPa) | 5481 | 5887 | 5639 | 4074 |
| Tensile Yield Elongation (%) | 5.3 | 4.4 | 4.3 | 5.3 |
| Tensile Elongation at Break (%) | 20 | 6.5 | 5.7 | 21 |
| Flex strength (MPa) | 167.5 | 159.3 | 157.2 | 156.4 |
| Flex modulus (MPa) | 5005 | 5108 | 5102 | 4038 |
| Notched Izod, (J/m) | 91.3 | 82.8 | 72.6 | 104.7 |
| No Notch Izod, (J/m) | NB | 1121 C | 924 C | NB |
| HDT (° C.) | 164 | 173 | 172 | 159 |
| Viscosity (kPa · s) | 0.52 | 0.57 | 0.55 | 0.42 |
| VR 40 | 1.22 | 1.00 | 1.17 | 1.01 |
| Crystallization temp. (° C.) | 292.2 | 293.3 | 293.2 | 276.7 |
| G' Modulus (Pa) × $10^{-8}$, via DMA | 1.88 | 2.90 | 2.58 | 1.23 |

[1)]Superior Graphite 4735 from SuperiorGraphite
[2)]MPC Channel Carbon Black from Golden Bridge Ent. Inc.
[3)]Carbon Fiber Sigrafil ® C 30 from SGL carbon group
[4)]Ketjen Black Carbon Black EC 600 JD from Akzo Nobel with high specific surface area (appr. 800 m²/g)
*Comparative Examples not in accordance with the invention
C: complete break
NB: no break The results in Table 4 show that poly(arylether ketone) compositions comprising graphene materials provide a good and well balanced property spectrum. Compared to compositions with MPC carbon black (Example 13) or Ketjen black carbon black (Example 18) the compositions in accordance with the instant invention exhibit a higher modulus and higher impact strength as well as an increase in modulus at 200° C. Furthermore, the crystallization temperatures are significantly higher, which is an important benefit in processing.

Compared to compositions comprising carbon fibres (Example 14), it is very surprising that the tensile and flexural modulus of the graphene modified formulations reach a level of 75 to 80% of the level achieved with carbon fibres when one takes into account the dramatic difference in the materials. Whereas the carbon fibre compositions show brittle elongation behaviour and poor impact strength, the graphene material based formulations exhibit a significantly improved level in this regard. Furthermore, carbon fibres have no beneficial effect on the crystallization temperature as shown in the compositions comprising graphene materials.

Compositions comprising standard graphite (Example 12) seem to come closest to the graphene comprising compositions in accordance with the instant invention; however, the increase in modulus is less pronounced compared to graphene containing compositions and the graphene containing compositions show a considerably better impact strength.

To show the improved property balance of the compositions in accordance with the instant invention compared to the compositions of the prior art, a ratings table is show below. A rating in the range of from 1 to 5 was assigned for each of eight properties or property categories. The higher the total rating the better the balance of the properties. This table shows that the compositions in accordance with the instant invention outperform the compositions of the prior art by a margin of approximately 5 (28 vs. 23). The additive content in all examples of Table 5 was 7.5%.

TABLE 5

| Example | 1* | 4 | 7 | 10 | 12* |
|---|---|---|---|---|---|
| Additive | None | NG 1 | NG 2 | NG 5 | SG 4735 |
| Tensile modulus | 1 | 4 | 4 | 4 | 3 |
| Tensile Elongation at break | 5 | 1 | 3 | 1 | 3 |
| Flexural modulus | 1 | 4 | 4 | 4 | 3 |
| % Ductile Breaks No Notch Izod | 5 | 1 | 4 | 1 | 1 |
| Delta HDT | 1 | 4 | 2 | 3 | 1 |
| Delta Tc | 1 | 4 | 3 | 5 | 2 |
| G' modulus at 200° C. | 1 | 5 | 3 | 4 | 3 |
| Isotropic behavior | 5 | 4 | 4 | 4 | 3 |
| TOTAL OF ALL RATINGS | 20 | 27 | 27 | 26 | 19 |

| Example | 13* | 14* | 15 | 16 | 17 | 18* |
|---|---|---|---|---|---|---|
| Additive | Ketj. | C30 | NG 3 | NG 4 | NG 6 | MPC |
| Tensile modulus | 2 | 5 | 4 | 4 | 4 | 2 |
| Tensile Elongation at break | 2 | 1 | 4 | 1 | 1 | 4 |
| Flexural modulus | 3 | 5 | 4 | 4 | 4 | 2 |
| % Ductile Breaks No Notch Izod | 3 | 1 | 5 | 1 | 1 | 5 |
| Delta HDT | 2 | 5 | 1 | 3 | 3 | 1 |
| Delta Tc | 1 | 1 | 4 | 5 | 5 | 1 |
| G' modulus at 200° C. | 2 | 4 | 2 | 4 | 4 | 1 |
| Isotropic behavior | 5 | 1 | 4 | 4 | 4 | 5 |
| TOTAL OF ALL RATINGS | 20 | 23 | 28 | 27 | 27 | 21 |

*Comparative Examples not in accordance with the invention

EXAMPLES 19 TO 25

A laboratory-scale twin-screw DSM Xplore 15 cc Micro-Compounder from DSM corporation utilizing 2 vertically aligned conical screws was used to compound a set of 3 formulations containing 3%, 6% and 9% of the nano-graphene platelet material N002-001-00 in a natural PEEK resin obtained from Solvay Advanced Polymers (Examples 20 to 22). The PEEK resin was in pellet form and had a nominal melt viscosity of 0.44 kPa s as measured in a capillary rheometer at 400° C. and 1000 $s^{-1}$ per ASTM method D3835. The compounding of the nano-graphene platelet reinforcement was performed on the DSM extruder using the following conditions:

Batch size: 15 g
Set point barrel temperature: 430° C. in all three zones
Recorded melt temperature: 400° C.
Screw rotation speed: as high as possible (within torque limits of the instrument)
Recorded axial force: 8100-8700 N (upper limit of the instrument 9000 N)
Residence time: 5 minutes
Purge gas: nitrogen Injection molding was carried out immediately following compounding using the same DSM extruder connected to a mold system. Conditions of the molding process are outlined below:

Transfer nozzle temperature: 380° C.
Mold temperature: 200° C.
Injection pressure: 11 bar for 2 seconds
Holding pressure: 16 bar for 15 seconds On average, 5 tensile bars of the ISO 527-2-IBA geometry were obtained per run.

Mechanical property testing was carried out per the ISO 527 standard to generate the tensile strength (at yield), elongation at break and modulus of elasticity. Tensile specimens were similarly injection molded out of the unmodified PEEK resin thereby forming the composition of Example 19.

In a manner similar to that described for examples 20 to 22, compositions of PEEK resin containing 3, 6 and 9 wt. % of a multi-walled carbon nanotube Nanocyl® 7000 from Nanocyl corporation, was tumble blended then compounded in the lab scale DSM compounder using similar compounding conditions as described for Examples 20 to 22. ISO 527-2-IBA tensile specimens were similarly injection molded and tested per the ISO specification to generate the tensile properties of these three formulations.

The results of the measurements for Examples 19 to 25 are given in Table 6.

TABLE 6

| Example | 19 | 20 | 21 | 22 |
|---|---|---|---|---|
| PAEK Amount wt. % | 100 | 97 | 94 | 91 |
| Additive | — | NG 3 | NG 3 | NG 3 |
| Amount wt. % | — | 3 | 6 | 9 |
| Tensile Yield Strength (MPa) | 88.6 | 92.0 | 95.3 | 99.8 |
| Tensile modulus (MPa) | 3350 | 3909 | 4371 | 5191 |
| Tensile Elongation at Break (%) | 72 | 62 | 36 | 22 |
| Screw rotation speed (RPM)[1)] | 250 | 200 | 190 | 200 |

| Example | 23* | 24* | 25* |
|---|---|---|---|
| PAEK Amount wt. % | 97 | 94 | 91 |
| Additive | Nanocyl ® 7000 | Nanocyl ® 7000 | Nanocyl ® 7000 |
| Amount wt. % | 3 | 6 | 9 |
| Tensile Yield Strength (MPa) | 96.9 | 102.4 | 110.0 |
| Tensile modulus (MPa) | 3633 | 4123 | 4750 |
| Tensile Elongation at Break (%) | 16 | 8.8 | 11 |
| Screw rotation speed (RPM)[1)] | 150 | 70 | 20 |

[1)]Maximum possible screw rotation speed was used such that the equipment did not exceed its torque limit. The lower the screw rotation speed, the higher the viscosity of the resin was during compounding
*Comparative Examples not in accordance with the invention The specific surface area (BET) of NG 3 as used in Examples 20 to 22 is on the order of 30 m²/g based upon testing of comparable materials whereas the specific surface area of Nanocyl® 7000 measured under identical conditions was 299 m²/g. Superior Graphite 4735 (standard graphite used in the previous Examples when measured under identical conditions had a specific surface area of 4 m²/g).

It is evident from Table 2 that the PEEK formulations based on nano-graphene platelets (NGP) offer a better combination of properties than the corresponding multi-walled carbon nanotube (MWNT) formulations. Most importantly, a key difference between the NGP and MWNT formulations is the much higher ductility as evidenced by the much higher elongation at break values. In fact, it can be observed that even the formulation of example 22, which contains 9% NGP still exhibits higher tensile elongation at break and a better overall property balance than Comparative Example 23, which only contains 3 wt. % of multi-walled carbon nano-tubes. It is also notable that, the formulations of this invention also exhibit higher tensile modulus of elasticity than the corresponding MWNT formulations, thereby reflecting a greater ability for NGP to increase the stiffness of PEEK polymer as compared with MWNT.

Apart from the mechanical property advantages of NGP over the MWNT carbon nanotube formulations of the prior art, processing is more difficult with MWNTs than with NGP. Viscosity increased heavily with the introduction of MWNT and the processing parameters had to be modified accordingly, namely, a major reduction in the screw speed of the DSM extruder to avoid exceeding the torque limit of the extrusion apparatus.

The polymer compositions in accordance with the instant invention can preferably be used for the manufacture of molded articles, in particular by injection molding or compression molding. The molded articles can be of any shape known to the skilled person.

Furthermore, the polymer compositions in accordance with the instant invention can also be advantageously used for the manufacture of extruded articles, in particular of rods, tubes, sheets or films. Compositions of the prior art comprising poly(arylether ketone) polymers and reinforcing fillers cannot easily be formed into films.

Should the disclosure of any patents, patent applications, and publications which are incorporated herein by reference conflict with the description of the present application to the extent that it may render a term unclear, the present description shall take precedence.

The invention claimed is:
1. A polymer composition comprising
A) a poly(arylether ketone); and
B) from 0.1 to 70 wt. %, based on the combined weight of components A) and B), of at least one non-tubular graphene material,
wherein said poly(arylether ketone) comprises one or more of the recurring units of formulae selected from the group consisting of following formulae (1) to (5)-

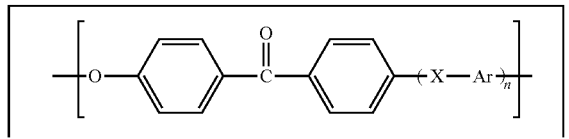

-continued

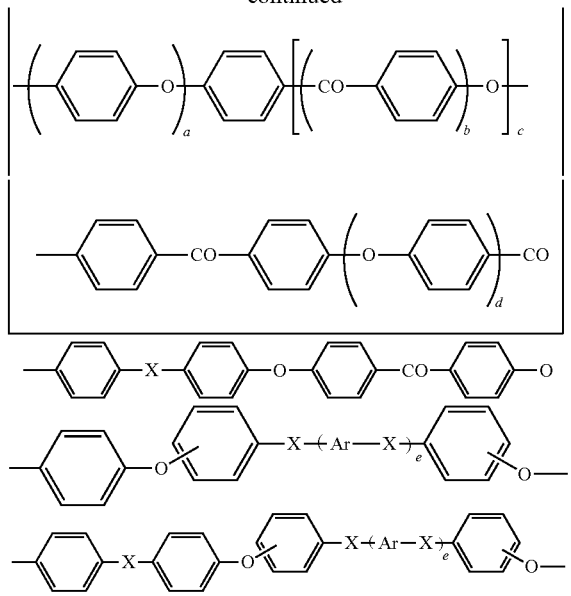

wherein
Ar is independently a divalent aromatic radical selected from the group consisting of
phenylene, biphenylene, and naphthylene;
X is independently —O—, —CO— or a direct bond;

n is an integer of from 0 to 3;
a is an integer of from 1 to 4;
b, c, d and e have independently the value 0 or 1; and d is 0 if b is 1.

2. The polymer composition in accordance with claim 1, wherein the non-tubular graphene material is a sheet material.

3. The polymer composition in accordance with claim 1, wherein the content of said component B) is at least 0.5 wt. % based on the combined weight of said components A) and B).

4. The polymer composition in accordance with claim 3, wherein the content of said component B) is at least 1 wt. % based on the combined weight of said components A) and B).

5. The polymer composition in accordance with claim 1, wherein the content of said component B) is at most 20 wt. % based on the combined weight of said components A) and B).

6. The polymer composition in accordance with claim 1, further comprising a semicrystalline polymer other than a poly(arylether ketone) in a weight ratio of said poly(arylether ketone) to said semicrystalline polymer of greater or equal to 1.

7. The polymer composition in accordance with claim 1, further comprising an amorphous polymer in a weight ratio of said poly(arylether ketone) to said amorphous polymer of greater or equal to 0.5.

8. The polymer composition in accordance with claim 1, wherein the poly(arylether ketone) comprises one or more of the recurring units of formulae selected from the group consisting of following formulae (6) to (25):

(6)
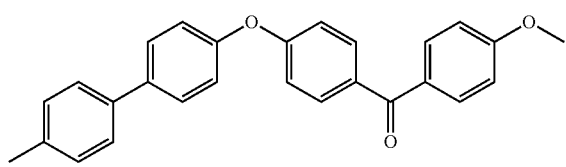

(7)
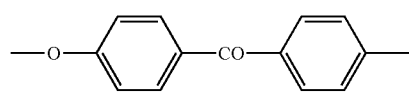

(8)
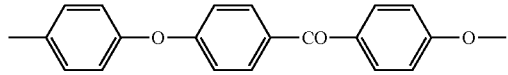

(9)
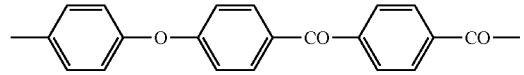

(10)
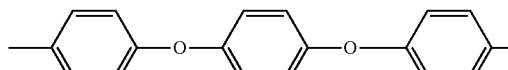

(11)
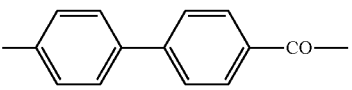

(12)
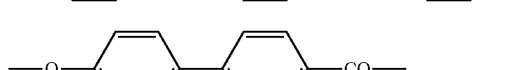

(13)

(14)
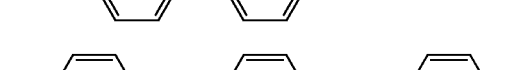

(15)
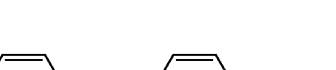

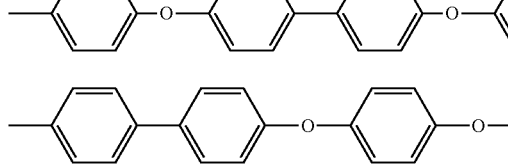

-continued

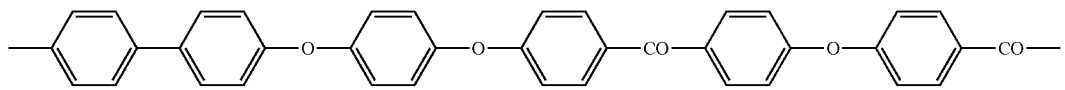  (16)

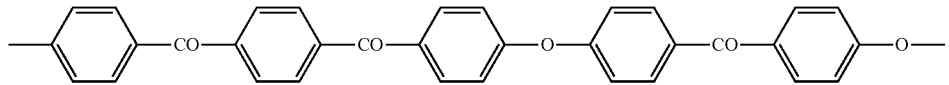  (17)

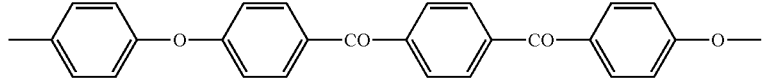  (18)

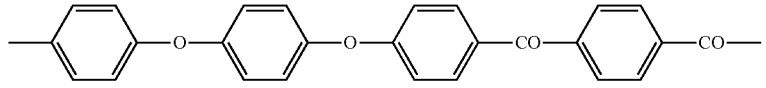  (19)

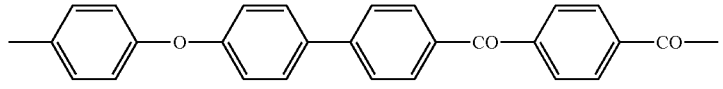  (20)

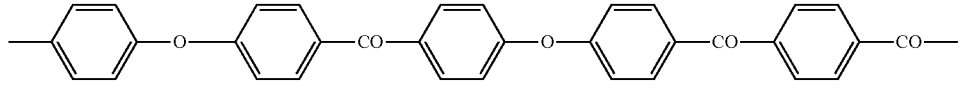  (21)

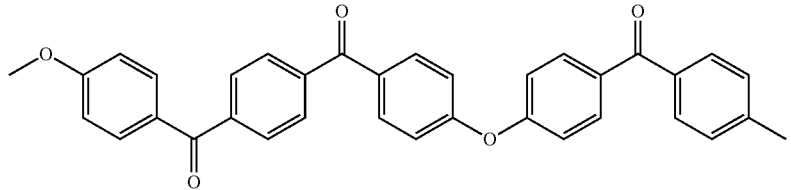  (22)

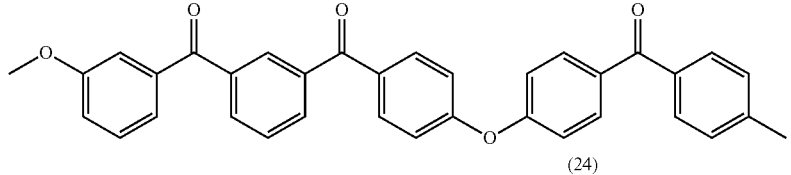  (23)

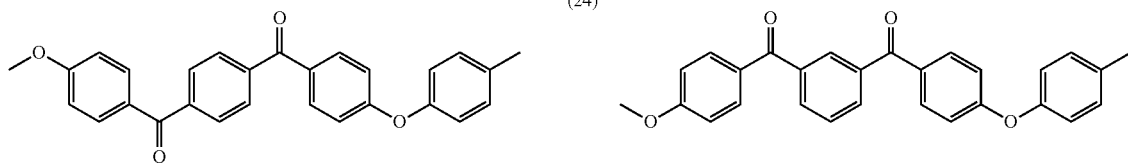

(24)                                         (25)

9. The polymer composition in accordance with claim 8, wherein the poly(arylether ketone) comprises one or more of the recurring units of formulae selected from the group consisting of said formulae (6) to (8).

10. The polymer composition in accordance with claim 1, wherein nano-graphene platelets are used as said non-tubular graphene material in said composition.

11. A molded or extruded article made from the polymer composition in accordance with claim 1.

12. The article in accordance with claim 11, being an extruded article selected from the group consisting of rods, tubes, sheets, and films.

13. A method for the manufacture of an article, comprising molding the polymer composition according to claim 1.

14. A method for the manufacture of an article, comprising extruding the polymer composition according to claim 1.

15. The polymer composition in accordance with claim 1, wherein said graphene material has a specific surface area, as measured by BET method, which is less than 40 $m^2/g$.

16. The polymer composition in accordance with claim 1, wherein said graphene material has a specific surface area, as measured by BET method, which is less than 30 $m^2/g$.

17. The polymer composition in accordance with claim 1, wherein said graphene material has a specific surface area, as measured by BET method, which is up to 20 $m^2/g$.

18. The polymer composition in accordance with claim 1, wherein said graphene material has a specific surface area, as measured by BET method, which exceeds 6 $m^2/g$ and is less than 40 $m^2/g$.

19. The polymer composition in accordance with claim 1, wherein said graphene material has a specific surface area, as measured by BET method, which exceeds 12 $m^2/g$ and is below 30 $m^2/g$.

* * * * *